United States Patent [19]
Johnson et al.

[11] Patent Number: 5,950,353
[45] Date of Patent: Sep. 14, 1999

[54] GLUE BOARD WITH AGGRESSIVE MECHANICAL SURFACE

[75] Inventors: Daniel C. Johnson; Richard L. Leyerle, both of Madison, Wis.

[73] Assignee: Bell Labortories, Inc., Madison, Wis.

[21] Appl. No.: 08/874,420

[22] Filed: Jun. 13, 1997

Related U.S. Application Data

[63] Continuation-in-part of application No. 08/644,267, May 10, 1996, which is a continuation-in-part of application No. 08/440,006, May 12, 1999, Pat. No. 5,577,342.

[51] Int. Cl.$^6$ .................................................. A01M 1/14
[52] U.S. Cl. ................................ 43/58; 43/114; 206/557
[58] Field of Search ............................ 229/407; 206/557, 206/561, 564; 43/58, 114

[56] References Cited

U.S. PATENT DOCUMENTS

| | | |
|---|---|---|
| 731,843 | 6/1903 | Bierley . |
| 2,138,926 | 12/1938 | Karfiol ........................................ 43/114 |
| 3,067,921 | 12/1962 | Reifers ...................................... 229/407 |
| 3,738,251 | 6/1973 | Haaser ................................. 206/557 X |
| 4,244,134 | 1/1981 | Otterson ........................................ 43/58 |
| 4,685,244 | 8/1987 | Marks ........................................... 43/58 |
| 4,834,243 | 5/1989 | Langenbeck ............................. 206/557 |
| 5,577,342 | 11/1996 | Johnson et al. ............................ 43/114 |
| B1 4,438,584 | 4/1987 | Baker et al. .................................. 43/58 |

FOREIGN PATENT DOCUMENTS 581474   7/1944   United Kingdom .

OTHER PUBLICATIONS

"Active Rat Boards™," *Pest Control,* undated.
"Rats and Mice Eliminated," *Pest Control,* Sep. 1976.
"Now, Trap–Stik™ in trays. Drop'em in their tracks," Southern Mill Creek Products Company, Inc., Tampa, Florida, undated.
"Rodent Control Product and Label Guide, 1994 Edition, Bell Laboratories, Inc.," Madison, Wisconsin, pp. 1, 17, 22 and 23.
Exhibits A, B, C, D, and E are photographs of PIC® Mouse Glue Traps, manufactured by Pic Corp., of Orange, N.J.

*Primary Examiner*—David A. Scherbel
*Assistant Examiner*—Anthony Ojini
*Attorney, Agent, or Firm*—Lathrop & Clark LLP

[57] ABSTRACT

A tray has sidewalls which extend upwardly from a base sheet. Rodent entrapping adhesive is disposed between the sidewalls on the base sheet. An aggressive mechanical surface, for example in the form of a plurality of closely spaced protruding ridges, are formed to extend upwardly from the base sheet. The adhesive is retained mechanically on the aggressive mechanical surface. A region of the base sheet in the middle of the tray between two regions of aggressive mechanical surface may be left free of ridges to define a reservoir of glue to aid in the rodent entrapping performance of the tray and adhesive assembly.

7 Claims, 5 Drawing Sheets

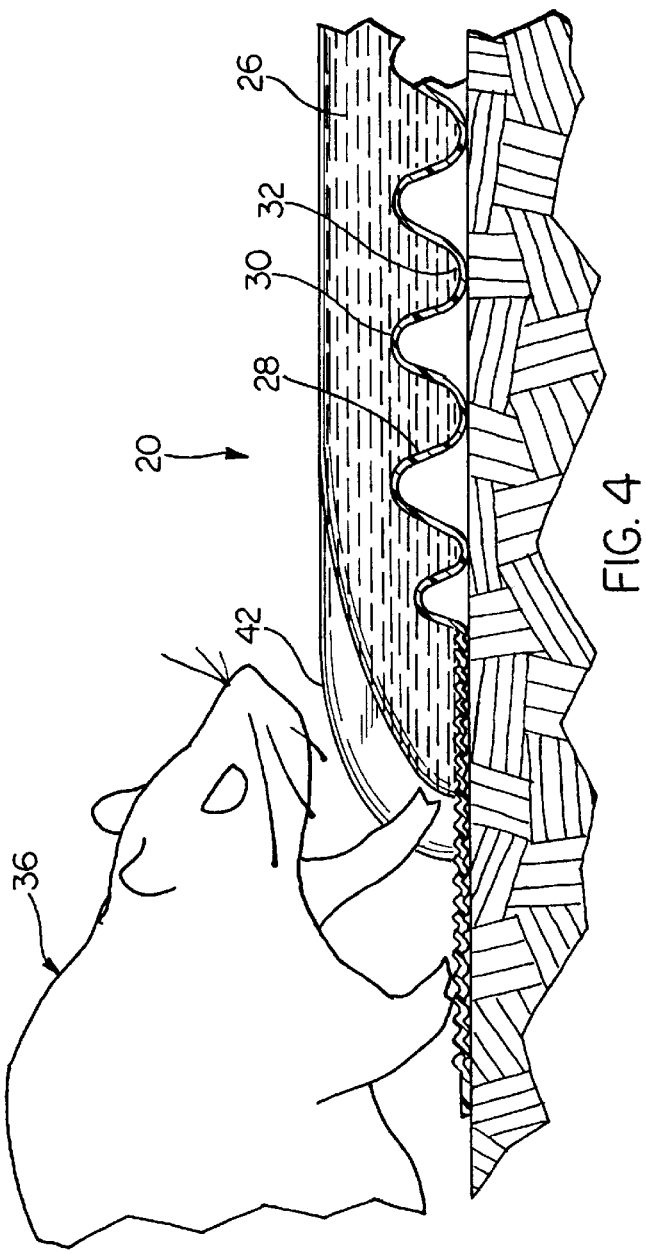
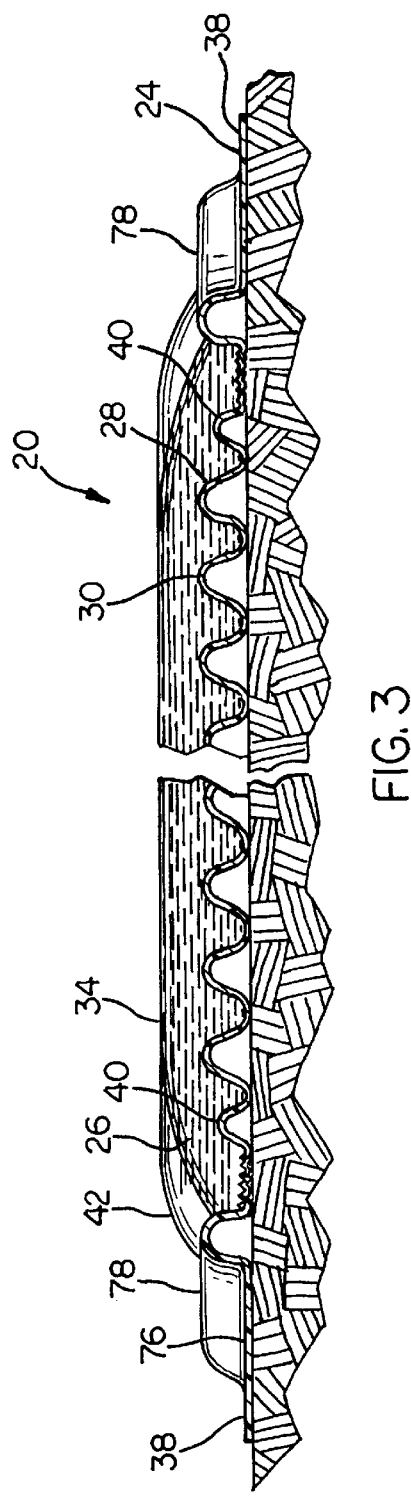
FIG. 4
FIG. 3

GLUE BOARD WITH AGGRESSIVE MECHANICAL SURFACE

RELATED APPLICATION

This application is a continuation-in-part of pending application Ser. No. 08/644,267, filed May 10, 1996, which is a continuation-in-part of application Ser. No. 08/440,006, filed May 12, 1999, now U.S. Pat. No. 5,577,342.

FIELD OF THE INVENTION

This invention relates to devices for removing targeted rodents in general, and in particular to devices which utilize an adhesive substance for entrapping rodents.

BACKGROUND OF THE INVENTION

Throughout history, rodents such as mice and rats have been persistent pests, consuming food supplies, soiling human habitations and workplaces, and spreading contaminants and disease. Rodents may be killed by the placement of poison in a form attractive to the rodent. However, in certain applications poisoned bait may be ineffective, for example in a granary where attractive rodent food is omnipresent. In other applications, poison may be unacceptable because of the close proximity to human food or non-target species, including pets.

Mechanical traps which use stored kinetic energy to enclose or crush the rodent have the advantage of retaining the dead rodent at a specific site for disposal. However, the moving parts of a mechanical trap add to the cost of manufacture.

Adhesive devices have been developed which present an expanse of highly retentive glue along a path frequented by rodents. A rodent making contact with the adhesive will be held and prevented from departure. Eventually the rodent will become suffocated in the adhesive, or will otherwise die. The glue-containing board and dead rodent may then be disposed of as a single unit.

Convenient packaging and shipment of glue boards is of great concern. The adhesive nature of such devices means that they must be shielded from contact with dirt and debris prior to use, lest the adhesive properties be reduced. Furthermore, for convenience to the user, the adhesive should be shielded from contact with clothing, hands, furniture, etc., until ready to be placed along a rodent runway.

Prior art glue boards have employed thermoformed plastic trays to contain the adhesive, and these trays have had indented portions with a flange which extends around the tray above the surface of the entrapping glue. Thus two prior art glue boards may be placed flange to flange, thereby spacing the glue of each from adhesive contact. Glue boards in the form of filled trays are advantageous from a manufacturing standpoint because of the simplicity of assembling two trays into a single saleable unit, and for the convenience of separating two snap-connected trays in the field.

Rodent glue boards filled with a hotmelt adhesive have been developed for shipment nationwide. Shipment by truck and storage of the packaged glue traps will subject the adhesive to elevated temperatures, and conventional glue traps have had to address the possibility of an inverted trap losing its glue as the adhesive becomes more flowable at higher temperatures. Commonly, flowing of the glue has been lessened by the use of a glue which is more resistant to flow at expected temperatures. Unfortunately, this change almost always comes at the cost of glue tackiness and rodent entrapping strength.

What is needed is an adhesive control device for rodents which allows compact and convenient packaging, which supports ready rodent entrapment, and which is fully transportable.

SUMMARY OF THE INVENTION

The glue board of this invention employs mechanical engagement of the adhesive by an aggressive surface formed within a tray. The mechanical engagement between the tray and the glue permits improved retention of whatever type of glue a manufacturer may choose to employ. Rodents are entrapped in a quantity of hot melt adhesive which is disposed within a tray having ridges disposed at the inlets to the tray. The ridges create a series of depressed valleys which receive the adhesive and engage the quantity of adhesive with the base sheet of the tray to mechanically retain the adhesive against shifting off the tray. The ridges may be parallel or may be a variety of aggressive mechanical surfaces formed in the base sheet to hold the adhesive and restrict its flow. A sidewall extends upwardly from the base sheet to surround the runway and serves to rigidify the base sheet. A peripheral flange extends outwardly from the sidewall, and is engageable against an opposed flange on a like glue board to permit convenient shipping of a pair of glue boards.

The aggressive mechanical surface may cover the entire base sheet, or it may be positioned at an inlet segment of the runway and an outlet segment of the runway on either side of an extended depth glue reservoir to combine rodent retentive and glue retentive properties in a single glue board. Alternatively, the aggressive mechanical surface may be defined on portions of the base sheet spaced inwardly from the sidewall to contribute to overall board rigidity.

It is an object of the present invention to provide a rodent entrapping glue board which has strong adhesive properties yet which is securely retained on the board.

It is also an object of the present invention to provide a rodent entrapping glue board which is economically manufactured.

It is another object of the present invention to provide rodent entrapping glue boards which are easily connected in pairs for separation in the field.

It is an additional object of the present invention to provide a rodent entrapping glue board which has improved rodent retentive properties.

It is a further object of the present invention to provide a rodent entrapping glue board which offers both improved glue retention and improved rodent retention.

Further objects, features and advantages of the invention will be apparent from the following detailed description when taken in conjunction with the accompanying drawings.

BRIEF DESCRIPTION OF THE DRAWINGS

FIG. 3 is a fragmentary cross-sectional view of the glue board of FIG. 2 taken along section line 3—3.

FIG. 4 is an enlarged fragmentary cross-sectional view of the glue board of FIG. 2 taken along section line 4—4 and showing rodent access to the glue board runway.

DESCRIPTION OF THE PREFERRED EMBODIMENT

Figure 1:
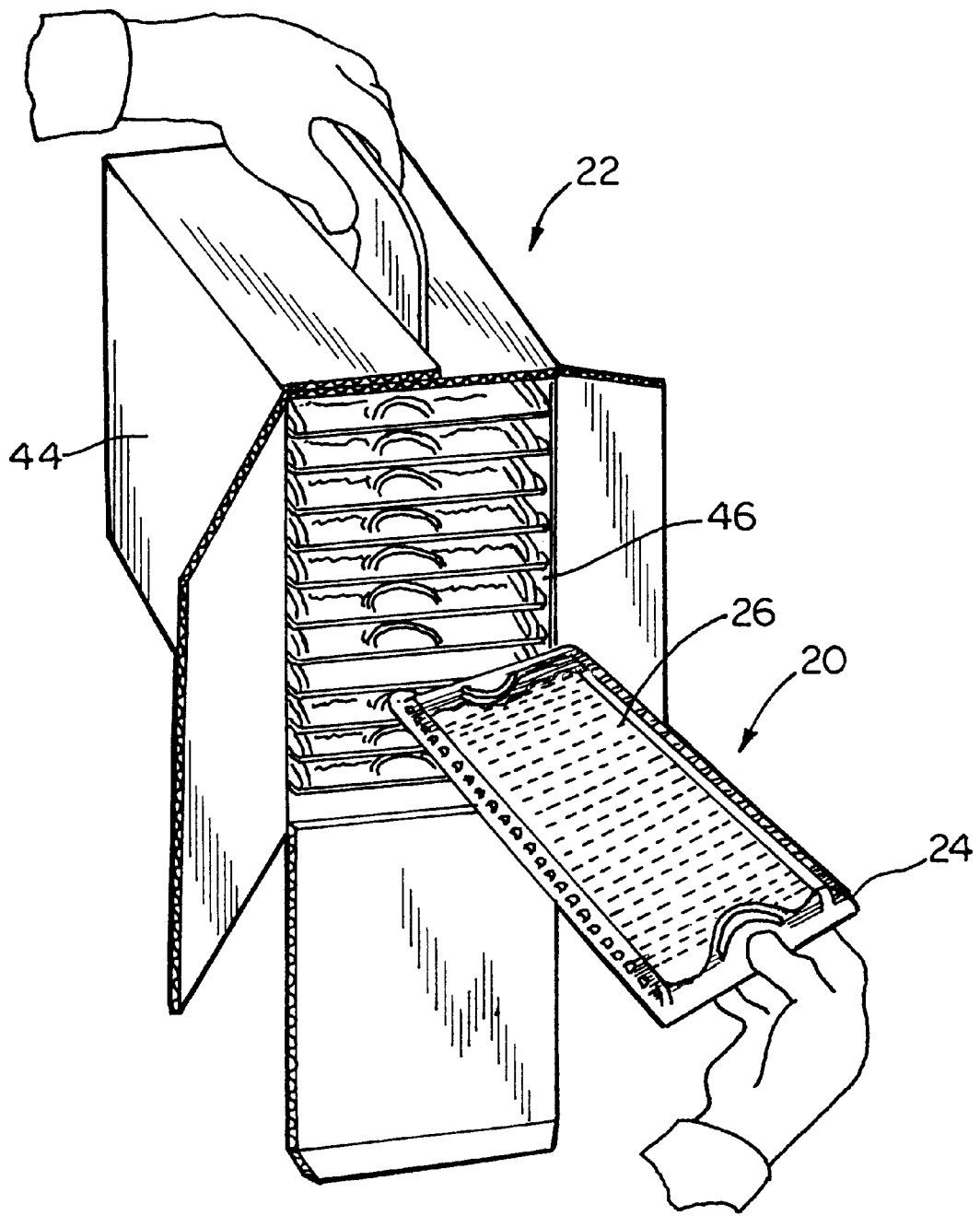
FIG. 1 is a perspective view of a rodent entrapping glue board of this invention being withdrawn from a glue board dispenser of this invention.

Referring more particularly to FIGS. 1–11, wherein like numbers refer to similar parts, a glue board 20 is dispensed from a dispenser 22 for placement by a Pest Control Operator (PCO) or consumer.

Each glue board 20 is comprised of two components: a plastic base sheet 24 and a quantity of adhesive 26 disposed on the base sheet. The base sheet is preferably thermoformed of 0.025 inch polystyrene plastic, but may be thermoformed of any suitable plastic material. The glue may be any appropriate hotmelt pressure sensitive adhesive which is sufficiently adhesive to capture a rodent, and yet sufficiently stable to be retained on the base sheet 26 at field temperatures and orientations expected to be encountered by the glue board 20, in storage, shipment and use.

Figure 2:
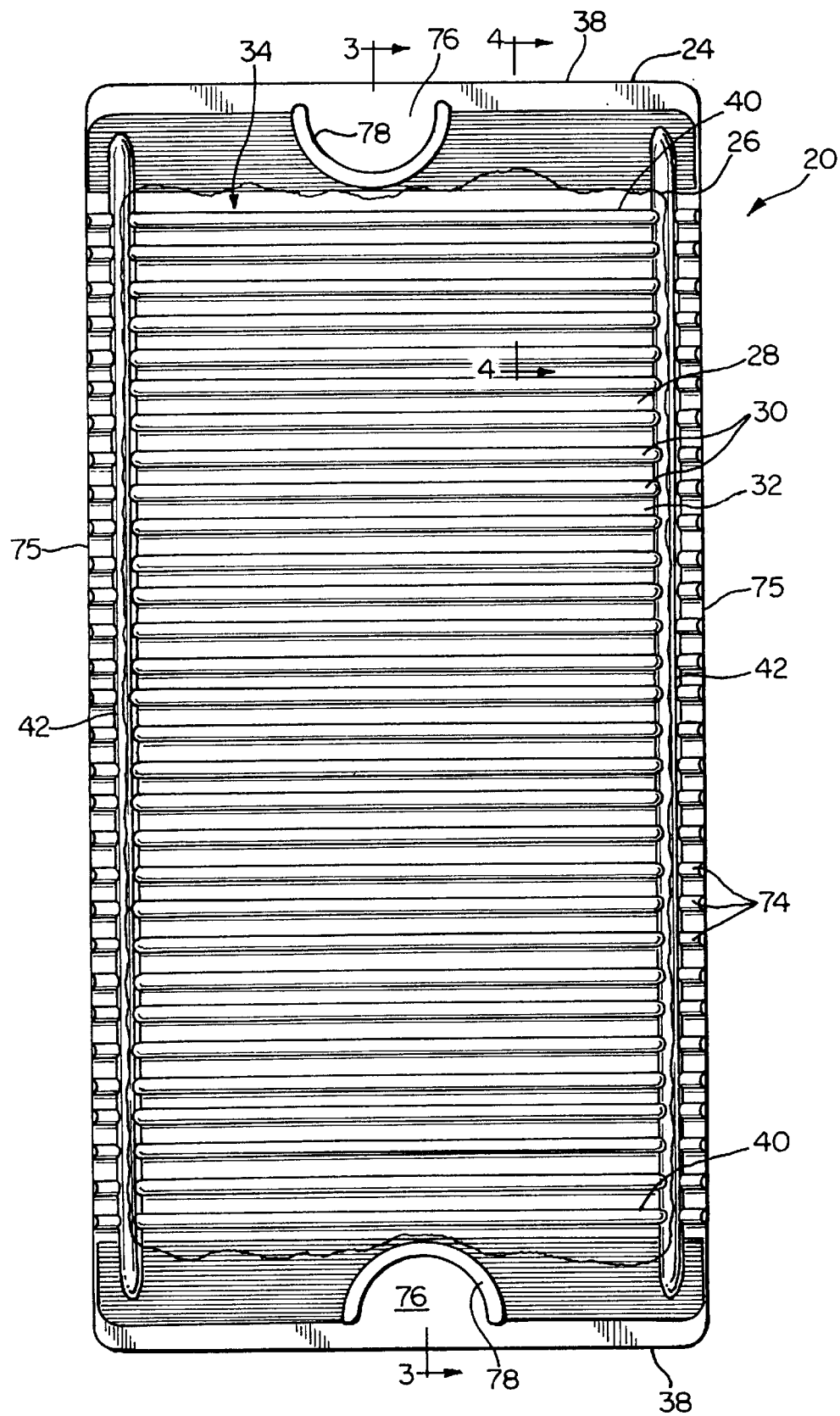
FIG. 2 is a top plan view of the glue board of FIG. 1.

As shown in FIG. 2, the base sheet 24 is provided with an aggressive mechanical surface 28 composed, for example, of a series of parallel ridges 30 separated by valleys 32. The aggressive mechanical surface 28 defines a rodent runway 34 which extends the length of the glue board 20. In a typical application, the glue board 20 will be positioned along a wall with the runway 34 parallel to the wall to position the adhesive 26 in a path frequented by rodents. As shown in FIGS. 3 and 4, the adhesive 26 covers the ridges 30 to present a clear expanse of adhesive for rodent entrapment.

The aggressive mechanical surface 28 interacts with the adhesive 26 in such a way as to give better adherence between the adhesive and the base sheet 24 than would be the case with a simple planar base sheet surface. The aggressive mechanical surface 28 serves to restrain movement of the adhesive in any direction. This improved adherence is useful in shipment of the glue boards where the possibility exists that the glue boards may be vertically oriented or inverted.

In addition, although a fairly narrow depth of adhesive extends above the surfaces of the ridges 30, the valleys 32 with their greater depth of adhesive provide additional adhesive which is continuous with the upper levels of adhesive. The additional adhesive can then be drawn from the valleys when a rodent engages the upper levels of adhesive, making it less likely that a rodent can pull its limbs out of engagement with the glue.

In general, there are three characteristics of adhesive which are of interest in glue board construction: tack and leg, which relate to the retention of a rodent to the adhesive; shelf life, which relates to how long the product may be stored before losing its effectiveness; and resistance to flow. The levels of these characteristics in any batch of adhesive can be adjusted by changing the formulation or manufacturing process of the adhesive. In general, improving the level of any one of the three characteristics will result in a reduced level of one or the other or both of the other two. Hence by providing an improved mechanical engagement between the adhesive and the base sheet, the glue board 20 allows an adhesive to be used which has improved qualities in shelf life, adhesiveness, or both.

The aggressive mechanical surface 28 may be formed in a variety of patterns, for example curved or circular ridges of sine wave or saw tooth cross-section. However, by forming the ridges 30 as parallel members which extend transversely across the base sheet 24 generally perpendicular to the runway 34, the ridges additionally serve to rigidify the base sheet 24 and limit warping or twisting of the glue board 20.

As shown in FIG. 4, the glue board 20 presents minimal impediments to the progress of a rodent 36 onto the runway 34. The access ends 38 of the glue board 20 have no raised lips or ledges which would present a significant obstacle to a rodent stepping onto the adhesive 26. The adhesive 26 extends over the aggressive mechanical surface 28 and terminates at the access ends 38. The adhesive 26 at the access ends 38 will have a thickness, with the result that adhesive surfaces are presented for rodent contact not only facing upwardly, but facing into the path of a rodent approaching the runway 34. To provide additional adhesive for initial entrapment, the initial ridges 40 at each access end 38 may be approximately half the height of the other ridges 30.

The glue board 20 is further stiffened by two ribs 42 which extend upwardly from the base sheet 24. As shown in FIG. 2, one rib 42 extends on either side of the runway 34. The ribs 42 may be generally parallel, and extend from one access end 38 to the other. The ribs 42 are approximately at or somewhat below the level of the adhesive 26 on the aggressive mechanical surface 28, depending on the particular conditions of manufacture.

The glue board 20 is manufactured by dispensing liquid adhesive 26 from several aligned dispensing nozzles onto a moving base sheet 24. Typically, the base sheet 24 will be moved with respect to the dispensing nozzles such that the nozzles move from one rib 42 to the other rib. The ribs 42 thus perform a secondary function of terminating the flow of adhesive while it is still in a freshly applied liquid state.

The glue board 20 of this invention achieves benefits of improved rodent accessibility by eliminating sidewall structure and presenting unobstructed entry to a rodent. Nonetheless, the advantages of manufacture and ease of packaging may call for a glue board which features a sidewall and peripheral flange. Furthermore, where larger rodents such as rats are targeted, it may be desirable to have a deeper expanse of glue which is facilitated by having a surrounding side wall.

Figure 5:
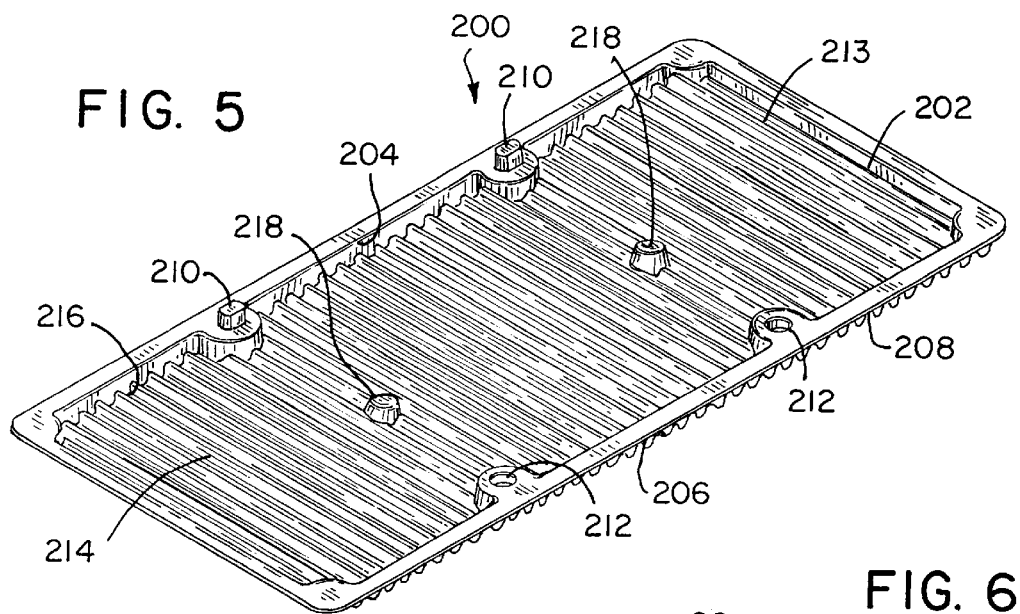
FIG. 5 is an isometric view of a plastic base for an alternative embodiment glue board of this invention having an upstanding sidewall.
Figure 6:
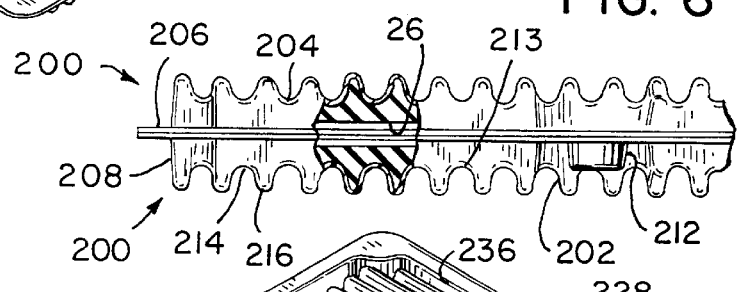
FIG. 6 is a side elevational view, partially broken away in section, of two glue boards of FIG. 5, placed together in a shipping configuration.

An alternative embodiment glue board 200, shown in FIGS. 5 and 6, has a base sheet 202 with upstanding sidewalls 204 and a peripheral flange 206 which surrounds the sidewalls. The base sheet 202 with sidewalls and flanges 206 defines a tray 208. Two projecting nubbins 210 are preferably formed on the tray 208 adjacent a flange 206, while receiving recesses 212 are formed on an opposite flange. As shown in FIG. 6, the recesses 212 on one tray 208 will thus receive the nubbins projecting from another like tray 208 in a snap fit. When connected, the adhesive 26 contained in the trays 208 is shielded from contact with environmental objects or the Pest Control Operator. Once in the field, the connected trays can be separated by hand immediately prior to placement.

The glue board 200 has an aggressive mechanical surface 213 defined by protrusions from the base sheet 202. The protrusions may be similar to those discussed in the glue board embodiments above, for example a series of alternating ridges 214 and valleys 216. The uppermost projections of the ridges 214 should be below the level of the flanges 206, to permit a quantity of adhesive 26 to be disposed over the ridges 214 to be engaged by the aggressive mechanical surface 213. In general, the ridges 214 should be about one third to one half of the glue thickness. To aid in spacing the adhesive in two connected glue boards to prevent contact, two spacing projections 218 may be formed on the interior of the tray extending upwardly from the base sheet 202. The spacing projections 218 of one glue board are positioned to extend to or above the level of the glue, and to engage against spacing projections on a connected glue board.

Figure 7:
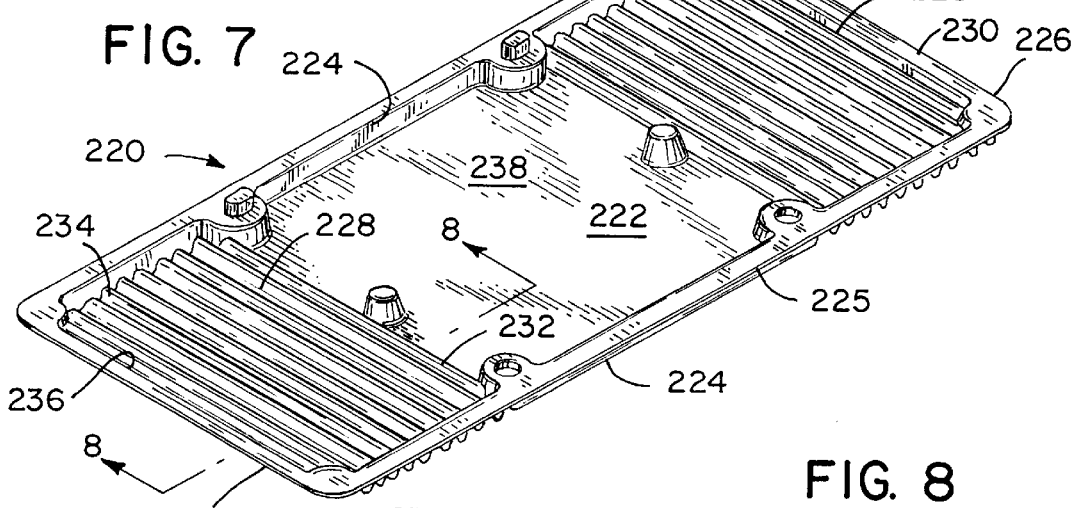
FIG. 7 is an isometric view of a plastic base for another alternative embodiment glue board of this invention, having inlet and outlet segments with aggressive mechanical surfaces on either side of a glue reservoir.
Figure 8:
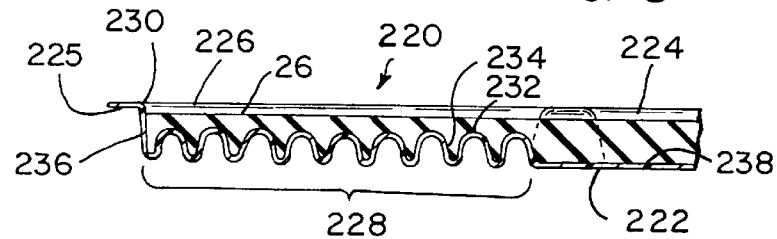
FIG. 8 is a cross-sectional view of the glue board having the base of FIG. 7 and taken along section line 7—7.

An alternative embodiment glue board 220 is shown in FIGS. 7 and 8. The glue board 220 also has a base sheet 222 with upstanding sidewalls 224 and a peripheral flange 225 which surrounds the sidewalls. The glue board 220 thus also has a tray 226 which contains the adhesive 26. The glue board 220 has aggressive mechanical surface regions 228 defined at each access end 230. The aggressive mechanical surface regions 228 are defined by projecting ridges 232 spaced by valleys 234. The aggressive mechanical surface regions 228, do not, however, extend the full length of the tray 226. Instead, the regions are only positioned adjacent the inlets to the glue board 220. In a preferred embodiment, the length of each aggressive mechanical surface region 228 is approximately 20 percent of the total length of the tray between inlet end walls 236. A glue reservoir 238 is defined between the two aggressive mechanical surface regions 228. The base sheet 222 at the glue reservoir is depressed to approximately the level of the valleys 234. Hence, as shown in FIG. 8, when the tray 226 is filled with adhesive 26, the glue reservoir 238 provides a quantity of deeper glue to aid in the retention of a rodent once it has entered the trap. Thus the glue board 220 advantageously restrains the glue mechanically, while also providing quantities of glue and a depth of glue for trapping of larger rodents.

Figure 9:
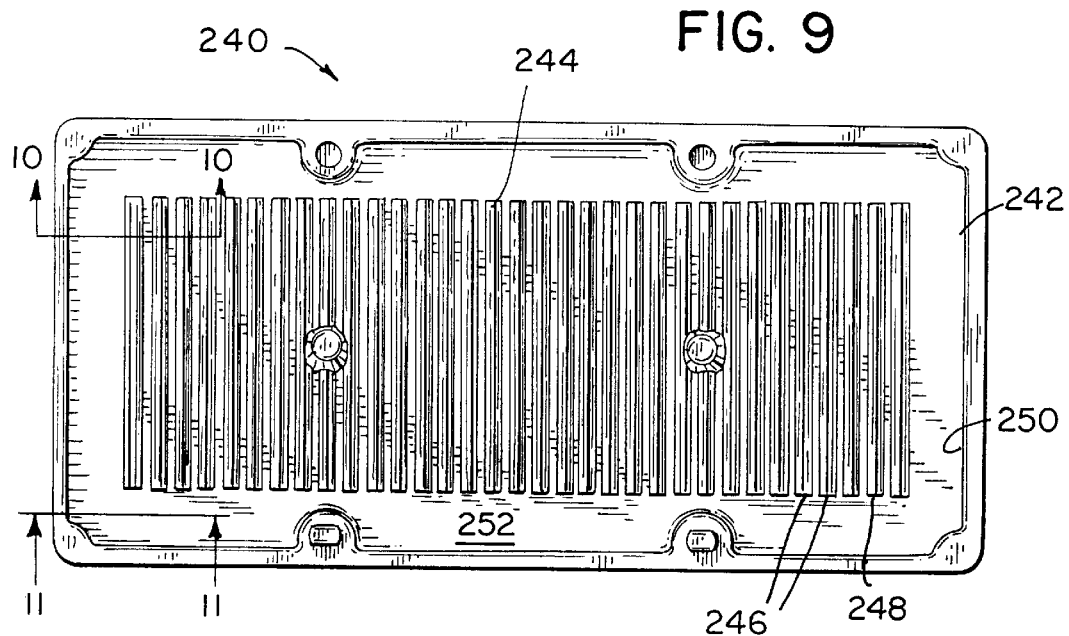
FIG. 9 is a top elevational view of another alternative embodiment glue board of this invention having an aggressive mechanical surface which is centrally positioned within the base sidewall.
Figure 10:
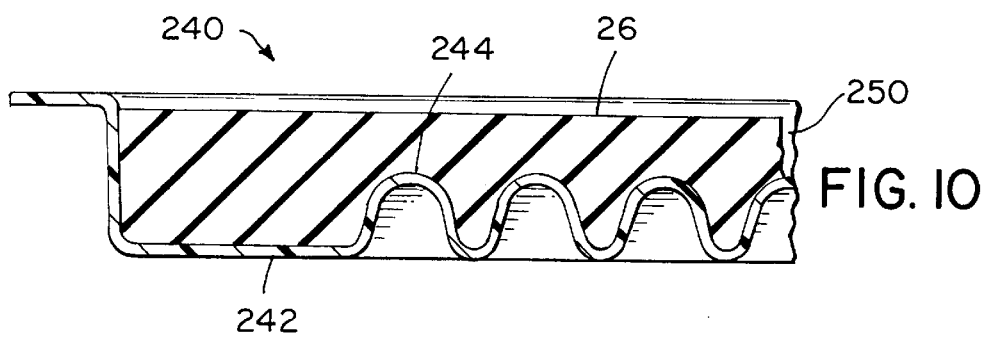
FIG. 10 is an enlarged fragmentary cross-sectional view of the glue board of FIG. 9 taken along section line 9—9.
Figure 11:
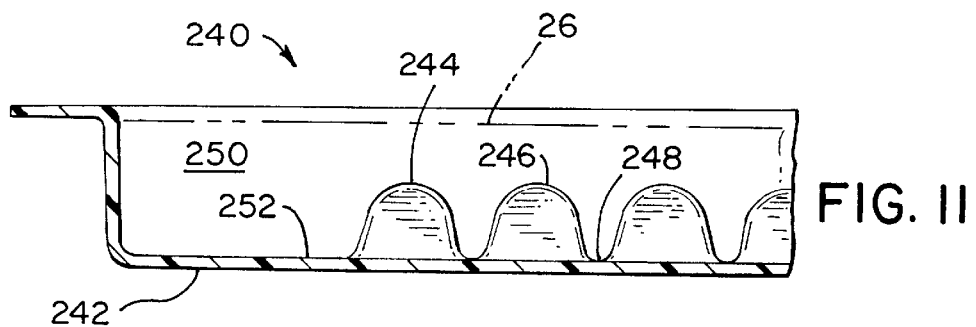
FIG. 11 is an enlarged fragmentary cross-sectional view of the glue board of FIG. 9 taken along section line 11—11.

Another alternative embodiment glue board 240, shown in FIGS. 9–11, has a base sheet 242 with an aggressive mechanical surface region 244 formed of alternating ridges 246 and valleys 248. The aggressive mechanical surface region 244 is disposed in the central region of the base sheet 242 spaced from the upwardly extending sidewalls 250. A non-ridged strip is defined between the aggressive mechanical surface region 244 and the sidewalls 250. Such a placement of the aggressive mechanical surface region 244 may improve the overall stiffness of the tray for a given thickness of plastic sheet from which the tray is formed. In some cases, however, the more flexible tray 200, of FIGS. 5 and 6 may provide some advantages in bending in response to target rodent exertions, and thus being more difficult for the rodent to separate from.

It should be noted that the glue boards of this invention may also be made with open-ended base sheets, without sidewalls, which have aggressive mechanical surfaces positioned along only a portion of the board.

It should be noted that, although the glue boards have been illustrated as rectangular; square, polygonal, or other geometric shapes may also be provided. Furthermore, the glue contained within the glue boards may be scented or provided with other attracting features to encourage rodent advancement onto the entrapping glue.

Furthermore, it should be noted that the ridges provide a means formed on the tray for retaining the glue on the tray, and that the ridges which thus define an aggressive mechanical surface may be formed in a variety of patterns. Thus the ridges may be the generally sine wave ridges shown, or square type ridges, or saw toothed triangular ridges, or any other appropriate ridge, which, preferably, is greater than one third the thickness of the glue depth.

It should be noted that although the base sheets of this invention have been disclosed as being thermoformed out of thin sheets of plastic, the sheets could also formed of other material. For example, thin sheets of aluminum or other metal could be stamped to form a base sheet. Metal base sheets are advantageous in that the temperatures at which the hot melt is dispensed would not significantly affect a metal base sheet.

It is understood that the invention is not limited to the particular construction and arrangement of parts herein illustrated and described, but embraces such modified forms thereof as come within the scope of the following claims.

We claim:

1. An article for entrapping rodents, comprising:
   a base sheet having upwardly extending sidewalls defining an enclosed tray;
   portions of the base sheet which define a plurality of closely spaced upwardly protruding transverse ridges, wherein valleys are defined between adjacent ridges, thereby defining a glue engagement surface; and
   a quantity of adhesive disposed on the base sheet to fill the valleys and overlie the ridges, wherein the adhesive is thereby retained on the base sheet, wherein the tray has opposite inlet ends, each inlet end leading to the quantity of adhesive, and wherein the glue engagement surface is formed adjacent each inlet end, on either side of a central glue reservoir, the overall depth of the glue within the glue reservoir being greater than the glue depth at the ridges, the width of the glue reservoir being greater than the distance between adjacent closely spaced transverse ridges, and wherein the base sheet at the glue reservoir extends at approximately the level of the valleys, and wherein the adhesive filled tray has a quantity of adhesive within the glue reservoir to aid in the retention of a rodent once it has entered the trap, the glue board thereby restraining the glue mechanically, while also providing a quantity of glue and a depth of glue for trapping of larger rodents.

2. The rodent entrapping article of claim 1 wherein the sidewalls include an inlet end wall at each inlet end, the two inlet end walls being spaced from one another a first distance, and wherein the length of the glue engagement surface formed adjacent each inlet end is approximately 20 percent of the first distance.

3. An article for entrapping rodents, comprising:
   a base sheet extending in a first direction from a first inlet end to a second inlet end, a rodent runway extending along the base sheet between the first inlet end and the second inlet end;
   portions of the base sheet which extend upwardly to define two glue engagement surface regions, a first region extending from the first inlet end and a second region extending from the second inlet end, the glue engagement surface regions comprising a plurality of closely spaced protrusions adjacent depressions, wherein a glue reservoir is defined between the first region and the second region, the width of the glue reservoir in the direction extending from the rodent inlet to the rodent outlet being greater than the distance between adjacent closely spaced protrusions; and a quantity of adhesive disposed on the base sheet to overlie the rodent runway, the glue engagement surfaces at the first region and the second region serving to restrain movement of the adhesive on the surface, and wherein the depth of the adhesive in the glue reservoir is greater than the minimum depth of glue in the first region and the second region.

4. The article for entrapping rodents of claim 3 wherein the portions of the base sheet which define glue engagement surfaces at the first region and the second region comprise a plurality of protruding ridges, with a plurality of valleys defined between the ridges, the adhesive being engaged within the valleys and over the ridges.

5. The article for entrapping rodents of claim 4 wherein the depth of glue within the glue reservoir is approximately the depth of the valleys in the first and second regions.

6. The article for entrapping rodents of claim 5 wherein the height of the protruding ridges above the valleys of the glue engagement surface is between about one third to one half of the depth of the glue in the glue reservoir.

7. The article for entrapping rodents of claim 3 further comprising upstanding sidewalls which extend upwardly from the base sheet to surround the first and second regions and the glue reservoir.

* * * * *